Feb. 15, 1944. D. R. LEHMAN 2,342,056
REPAIR DEVICE FOR LEAKY TIRE INFLATION VALVES
Filed Sept. 17, 1942
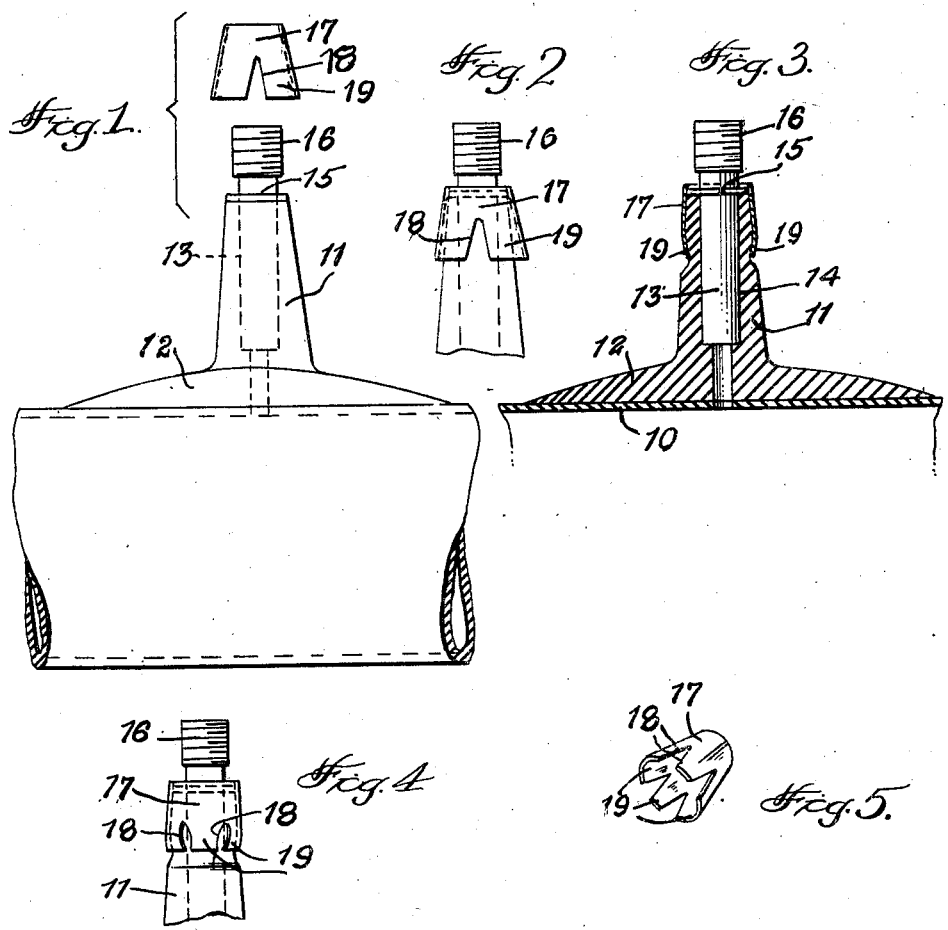
Inventor
D. R. Lehman
By Bryant & Lowry
Attorneys Patented Feb. 15, 1944

2,342,056

UNITED STATES PATENT OFFICE 2,342,056

REPAIR DEVICE FOR LEAKY TIRE INFLATION VALVES

David R. Lehman, Bethesda, Md.

Application September 17, 1942, Serial No. 458,704

1 Claim. (Cl. 285—84)

This invention relates to certain new and useful improvements in repair device for leaky tire inflation valves.

Tire valves of the inflation stem type for the inner tubes of the pneumatic tires now generally embody a rubber body of plug-like or barrel formation vulcanized to an inner tube and having vulcanized therein the usual metallic tubular valve stem carrying the valve mechanism. In the use of such tire inflation valve structures and as a result of vibration or crystallization, there is a tendency for the tubular metallic valve stem to break away or separate from the rubber barrel portion of the inner tube, resulting in air leaks and deflation of a tire. Leaks between the tubular metallic valve stem and the inclosing rubber body carried by the inner tube have heretofore caused considerable trouble and inconvenience as well as expense in that revulcanization jobs are expensive and when such leaks heretofore occurred it was customary to discard the old inner tube and purchase a new one.

In view of the shortage of rubber and metals, this applicant has devised a repair device for leaky tire valves of the inflation stem type.

It is therefore the primary object of the present invention to provide a repair device for leaky tire inflation valves wherein the valve embodies a frusto-conical barrel portion rising from an inner tube and housing a tubular metallic valve stem, the repair device comprising a frusto-conical thimble adapted for placement upon the outer end of the rubber neck portion of the valve with the inner end of the thimble manually pressed or crimped inwardly for moving the adjacent portion of the rubber neck into air-tight binding engagement with the metallic valve stem.

A further object of the invention is to provide a repair device for leaky tire inflation valves in the form of a frusto-conical thimble having a lower split skirt portion providing a plurality of fingers that are adapted to be manually pressed inwardly as by the use of a pair of pliers or the like, as distinguished from a machine operation, for compressing the adjacent rubber neck portion of the valve into binding engagement with the metallic valve stem for sealing a leak between the rubber neck and metallic valve stem.

A still further object of the invention is to provide a repair device for leaky tire inflation valves in the form of a frusto-conical thimble having a split skirt portion and with the taper of the thimble normally greater than the taper of the associated rubber neck portion of the valve to adapt the repair device to tire valves of different sizes, the split skirt portion being manually pressed or crimped inwardly to cause the adjacent portion of the rubber neck of the valve to be compressed into binding engagement with the metallic valve stem.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a fragmentary side elevational view showing a portion of an inner tube, the rubber neck portion of the inflation valve and the metallic valve stem therein together with the repair device in position for application to the tire valve, Figure 2 is a fragmentary elevational view of the tire inflation valve with the repair device initially placed upon the outer end of the rubber neck portion of the valve, with the repair device of frusto-conical form and illustrated as embodying a taper greater than the taper of the rubber neck portion of the valve, Figure 3 is a detail sectional view of the tire valve showing the repair device in compressed position thereon for sealing a leak between the rubber neck portion of the valve and the metallic valve stem, Figure 4 is a fragmentary side elevational view of the tire valve with the repair device in final position thereon, and Figure 5 is a perspective view of the repair device in the form of a frusto-conical thimble.

Referring more in detail to the accompanying drawing, the reference character 10 designates an inner tube for use with pneumatic tires and carrying the usual present-day type of inflation valve comprising a tapering or frusto-conical rubber neck portion 11 carrying an enlarged annular base 12 that is vulcanized, cemented or otherwise secured to the inner tube 10. The valve further includes the usual metallic valve stem 13 housed within a bore 14 in the rubber neck 11 of the valve, the metallic valve stem 13 carrying the usual collar 15 engaged with the outer end of the rubber neck 11 and also the usual threaded neck 16 at the outer end thereof for the reception of the usual valve cap, not illustrated.

In the manufacture of tire valve constructions of the foregoing character, an air seal is usually established between the rubber neck 11 and metallic valve stem 13 by a vulcanization method, but in the use of such a tire valve the metallic valve stem 13, due to vibration, crystallization of the rubber neck, impacts and other causes, becomes loose and presents an air escape through the bore 14 around the metallic valve stem. In the repair of such leaks, it has been difficult to effect a revulcanization of the parts, with the result that the entire inner tube with its valve mechanism has been discarded and a new tube and valve mechanism substituted.

The present invention relating to a repair device for such leaky tire inflation valves, comprises a thimble 17 of frusto-conical form, the thimble being open at both ends while the larger outwardly flared end is serrated or longitudinally split as at 18 to provide a plurality of gripping fingers 19. The taper of the thimble 17 is greater than the taper of standard rubber neck portions 11 of tire valves so that a repair device or thimble 17 of standard size may be used in connection with rubber neck portions 11 of different tapers as will be evident from an inspection of Figure 2 of the drawing, which shows the upper smaller end of the thimble 17 engaged with the upper end of the rubber neck 11, while the lower split end providing the fingers 19 presents such fingers outwardly spaced relative to the adjacent portions of the rubber neck 11. The thimble 17 is placed upon the outer end of the rubber neck 11 and by the use of a pair of hand pliers or the like, the fingers 19 of the thimble are crimped or pressed inwardly to the positions shown in Figures 3 and 4, such action resulting in considerable pressure upon the adjacent portion of the rubber neck 11 to cause such adjacent portion to be moved into binding and air-tight engagement with the metallic stem 13 of the valve to absolutely seal any air leak through the bore 14 in the rubber neck 11.

With a device of this character the life of the inner tube 10 and its associated valve mechanism may be indefinitely lengthened. Also, expensive machinery is unnecessary for the application of the repair thimble 17, a service station attendant or other person merely applying the repair thimble 17 to the outer end of the rubber neck 11 and moving the inner end of the same into compressive engagement with the rubber neck. The thimble 17 lies a considerable distance inwardly of the threaded neck 16 of the valve stem 13 and does not in any manner interfere with the application to the valve stem of the usual valve cap.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:

Means for sealing a leaky rubber neck portion surrounding a tire inflation valve, wherein the valve embodies a metallic stem having a radially extending collar adapted to seat on the free end of the rubber neck portion and extending substantially to the periphery thereof, said means comprising a cone-shaped thimble having slitted side walls and of a size at its smaller end to closely engage the periphery of said collar, and the slits extending substantially half the length of the thimble, the portions of the thimble between the slits being adapted to be pressed into clamping engagement with the adjacent portion of the rubber neck surrounding the valve stem.

DAVID R. LEHMAN.